Oct. 14, 1952 W. A. RAY 2,613,682
FLUID CONTROL VALVE
Original Filed May 20, 1941 3 Sheets-Sheet 1
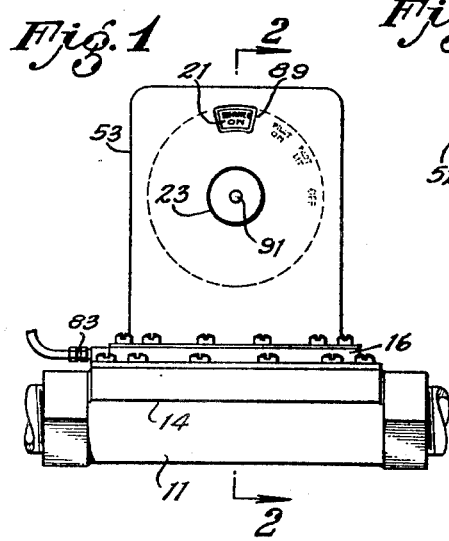
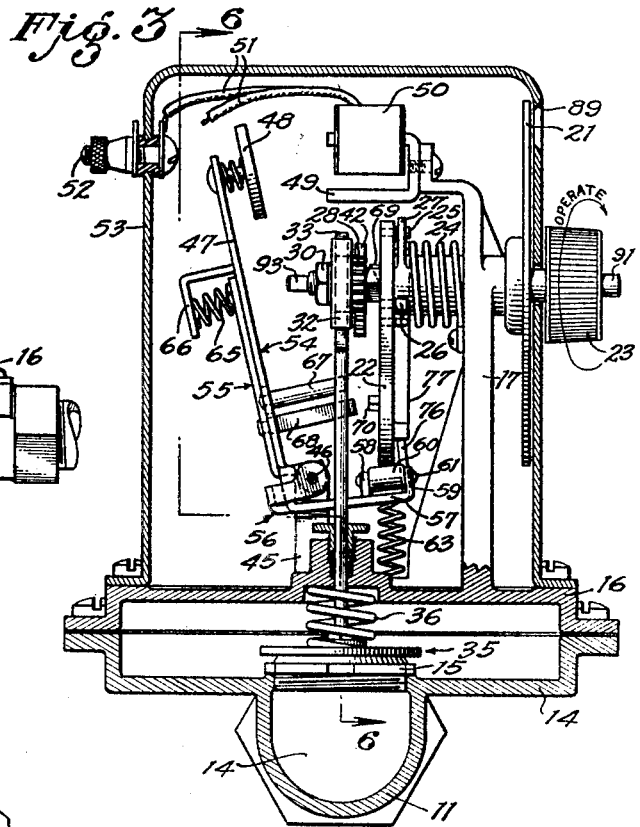
Inventor,
WILLIAM A. RAY,
By John H. Rouse,
Attorney Oct. 14, 1952 W. A. RAY 2,613,682
FLUID CONTROL VALVE
Original Filed May 20, 1941 3 Sheets-Sheet 2
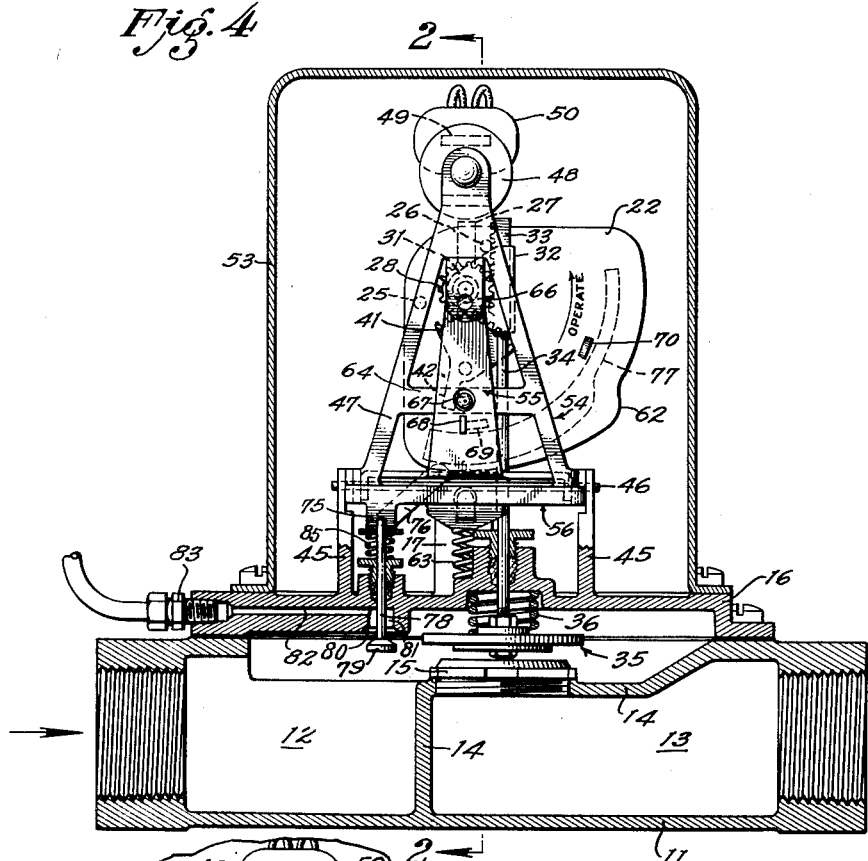
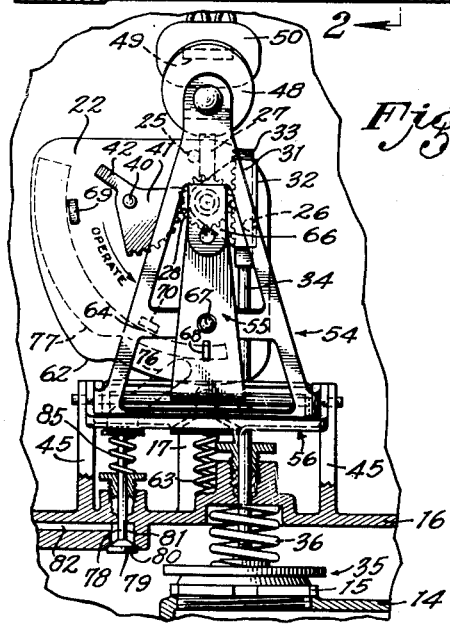
Inventor,
WILLIAM A. RAY
By John H. Rouse,
Attorney

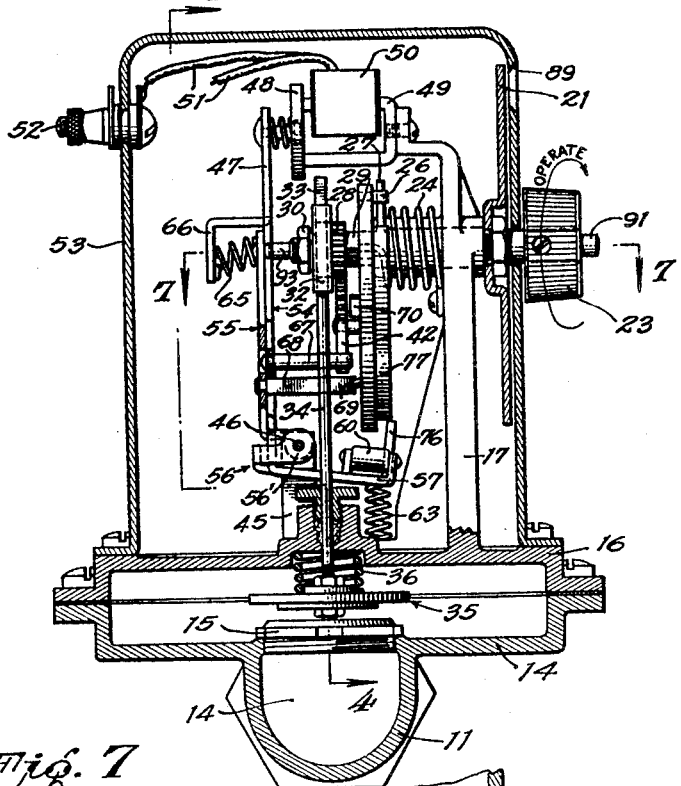
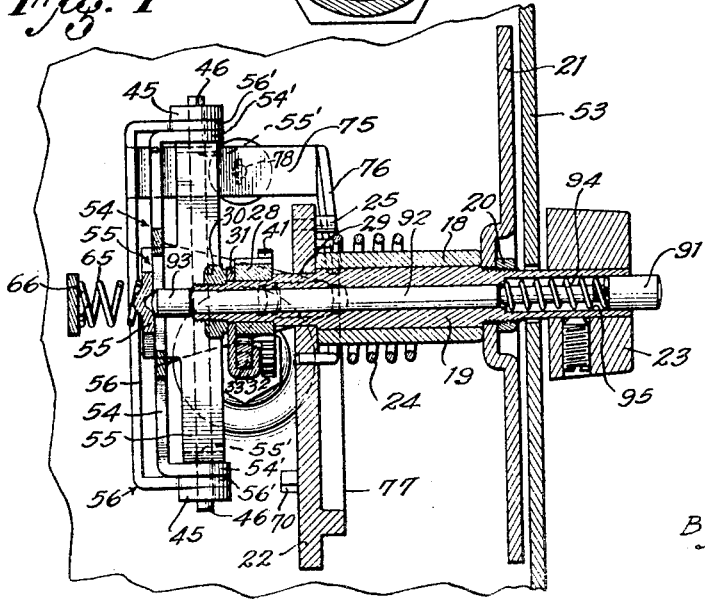

UNITED STATES PATENT OFFICE 2,613,682

FLUID CONTROL VALVE

William A. Ray, Los Angeles, Calif., assignor to General Controls Co., a corporation Original application May 20, 1941, Serial No. 394,338, issued as Patent No. 2,381,926, dated August 14, 1945, and reissued as Patent No. 23,077, January 11, 1949. Divided and this application June 29, 1945, Serial No. 602,362

4 Claims. (Cl. 137—66)

This invention relates to control apparatus; the present application being a division of my copending application Serial No. 394,338, filed May 20, 1941, issued August 14, 1945, as Patent No. 2,381,926 and reissued January 11, 1949, as Patent No. Re. 23,077, and is directed to improvements in fluid control valves of the type wherein a pair of ports are provided for passage of fluid through the valve.

When a valve of the character described is employed in connection with conventional gas-consuming heating apparatus, the individual ports serve to supply fuel to the main burner and the pilot burner; an object of the invention then being to provide means for opening the pilot-burner port, and means responsive to a resultant condition (such as the existence of flame at the pilot burner) whereby the main-burner port can then be opened and closed, but only while said condition exists.

Another object of the invention is to provide, in a valve of the character described in the preceding object, means for closing both of the ports in response to cessation of said condition.

For full understanding of the invention, and further appreciation of its objects and advantages, reference is to be had to the following detailed description and accompanying drawing, and to the appended claims.

In the drawing:

Figure 1 is a front elevation of a fluid control valve embodying the invention;

Figure 2 is a vertical section taken along the line 2—2 of Fig. 1 showing the parts in their fully-actuated positions; the section plane of Fig. 2 being indicated also in Fig. 4 by the line 2—2;

Figure 3 is a view similar to that of Fig. 2 but showing the parts in their normal, or unactuated, positions;

Figure 4 is a vertical section taken generally along the line 4—4 of Fig. 2;

Figure 5 is a fragmentary view similar to that of Fig. 4 but showing the parts in the positions which they assume at an intermediate point of actuation;

Figure 6 is a fragmentary section taken generally along the line 6—6 of Fig. 3;

Figure 7 is an enlarged fragmentary section taken along the line 7—7 of Fig. 2;

Figure 8 is a chart indicating the relative angular positions of the actuating member at various points of actuation; and Figure 9 is a generally-diagrammatic view of a gas burner control system including the valve shown in the other figures.

In the drawing, the numeral 11 indicates a valve casing having an inlet 12 and an outlet 13 separated by a partition 14, in an opening in which is threaded a valve-seat member 15. Provided over an opening in the upper surface of the casing is a cover member 16. Extending from a right-hand upper surface of the cover (Figs. 2 and 3) is an elongated bracket 17. As best seen in Fig. 7, the thickened upper portion 18 of the bracket is bored to receive a shaft 19, to a reduced right-hand portion of which is secured, by a nut 20, an indicating disk 21. Pressed on a left-hand squared portion 29 of shaft 19 is a cam plate 22. The length of the portion of shaft 19 between the disk 21 and cam plate 22 is such that the shaft is freely rotatable in the bracket portion 18. Secured to the reduced right-hand extremity of shaft 19 is a knob 23 for manual actuation of the device. The shaft is biased in a clockwise direction, as viewed from the back in Figs. 4, 5 and 6, by a torsion spring 24 secured at one end to the bracket 17 and at its other end to the cam plate, pins 25 and 26 on the cam plate limiting the rotation of the shaft by respective engagement with a lug 27 extending from the upper surface of the bracket portion 18.

Freely fitting on a reduced cylindrical left-hand end portion of shaft 19 is an idler gear 28, axial movement of which is limited by the shoulder of squared portion 29 and a nut 30 threaded on the left-hand extremity of shaft 19. Interposed between the gear and the nut, and freely fitting on shaft 19, is a plate 31, the outer end of which is bent to provide a U-shaped portion 32 which serves to maintain, intermeshed with a portion of gear 28, a gear rack 33 provided on the upper end of a rod 34. The lower end portion of this rod extends through, and is guided in, a thickened portion of the cover member 16 and carries at its bottom a main closure member 35 cooperable with the seat member 15. Biasing rod 34 downwardly, and the closure member toward its seat, is a compression spring 36.

Pivoted on a pin 40 extending from the lefthand, or rear, surface of cam plate 22 is a gear segment 41 which intermeshes with another portion of idler gear 28. Integral with and extending from a rear portion of the segment is a finger 42. When the shaft 19 is rotated from its normal position shown in Figs. 3 and 6, to which it is biased by spring 24, gear segment 41 is rotated about its pivot since the idler gear 28 is held from rotation by the engagement therewith of rack 33, which in turn is restrained from movement by the force of bias spring 36. It is thus seen that when segment 41 can revolve freely around gear 28, rotation of shaft 19 does not effect actuation of the closure rod 34; the gear, rack, and segment constituting effectively a planetary gear system. It will be understood therefore that in order to effect actuation of the closure member it is necessary to modify the movement of segment 41 relative to gear 28 to place the segment in driving relation to the gear; means for so doing hereinafter being described.

Extending from the upper surface of cover 16 is a pair of brackets 45, the upper ends of which serve to support a rod 46. Pivoted on this rod, with their respective opposite-end supporting ear portions 54', 55', and 56' in abutting relation, are three relatively-movable levers 54, 55 and 56. Carried by the extremity of the upper A-shaped arm-portion 47 of lever 54 is a disk-shaped armature member 48, rockably mounted thereon and cooperable with the pole faces of a U-shaped core 49, on one leg of which is provided an energizing coil 50, the leads 51 of which extend to terminals 52 insulatingly mounted in a side wall of a housing 53 provided for the enclosure of the parts. The electromagnet, comprising core 49 and coil 50, is rigidly mounted on a bent upper extension of the bracket 17. The lower end arm portion 57 of lever 54 is bent laterally below its pivot on rod 46 and is provided with upwardly-turned portions 58 and 59 between which a roller 60 is pivotally mounted on a pin 61. Roller 60 normally rests on the lower right-hand concentric edge portion of cam plate 22 as viewed in Fig. 6. When the plate 22 is rotated from its normal position as shown in Fig. 6, the roller is depressed by its engagement with an eccentric projection 62 formed on the edge of the plate, thereby rocking lever 54 so that its arm 47 assumes a vertical position (as shown in Fig. 2) with armature 48 in engagement with core 49. If the core 49 is energized the armature 48 will be magnetically retained in engagement therewith, thereby holding lever 54 against the force of a spring 63 compressed against arm 57 of this lever.

In the movement of arm 47 to its vertical position, lever 55 is carried therewith, the upper portion of this lever normally being held in engagement with the cross-bar 64 of arm 47 by the force of a spring 65 compressed between the upper end of lever 55 and a bracket 66 turned-up from the arm 47. Riveted to the cross-bar 64 of arm 47 is a laterally-extending pin 67, the free end of which, when arm 47 is in vertical position, is adapted to be engaged by the finger 42 of segment 41 in the rotation of plate 22. Riveted to an intermediate upper portion of lever 55 and extending through the opening below cross-bar 64 of arm 47 is a pin 68, rectangular in cross-section, the free end of which is adapted to be engaged by either of catches 69 or 70, formed on the rear surface of cam plate 22, when this plate is rotated and arm 47 is in vertical position with lever 55 held in engagement therewith, as will further be described in connection with the operation of the device.

The other lever 56 comprises a horizontal arm 75 (best seen in Fig. 7) the free end portion of which is upwardly bent to provide a finger 76 which is adapted to engage the undersurface of an additional cam 77 formed as an extension of the front surface of plate 22. Engaging the underside of arm 75 is the upper end of a supplemental valve stem 78 which extends downwardly through an opening in the cover 16 and is provided at its lower end with a supplemental valve head 79 cooperable with a valve seat 80 formed around an opening 81 in the bottom of a thickened portion of the cover. The opening 81 communicates by a passageway 82 with the periphery of the cover 16, a fitting 83 being provided for connecting the supplemental valve to supply fuel to a pilot burner 84 shown in Fig. 9. The supplemental valve head 79 is urged to closed position by a spring 85 compressed between gland nut 86 and a washer secured to the upper end of stem 78; the force of this spring also serving to hold finger 76 in a position wherein it is just out of engagement with the underside of the right-hand reduced concentric portion of cam 77. In Fig. 9, the device is shown connected to supply fuel to pilot burner 84 and to a main burner 87; a thermoelectric device 88, comprising a plurality of thermocouples the hot junctions of which are heated by the pilot burner flame 90, being provided for the energization of electromagnet coil 50.

Assuming that the device is connected as shown in Fig. 9 and that the pilot-burner flame is extinguished, the parts will be in the positions shown in Figs. 3 and 6 due to the deenergization of coil 50. To initiate operation of the burner system, knob 23 is turned in the direction of its arrow so that plate 22 is rotated in a counterclockwise direction as viewed in Figs. 4, 5 and 6. In the rotation of knob 22, successive legend-bearing portions of disk 21 become visible through a window 89 formed in the front wall of housing 53. These legends are shown in Fig. 1 and are intended for the guidance of the operator in setting the device. When, in initiation of operation, the legend "Pilot on" appears, the knob is manually retained in that position, the various parts being in the positions shown in Fig. 5 with the supplemental valve head 79 in open position due to the engagement of finger 76 with the enlarged concentric portion of cam 77, which engagement effected downward movement of the supplemental valve stem through arm 75. In the movement of the parts to "Pilot on" position, by the engagement of cam projection 62 with roller 60, arm 47 was brought to vertical position with armature 48 in engagement with core 49. Gas now flowing to the pilot burner 84 is lighted and, when the thermoelectric device 88 has become sufficiently heated to generate current in an amount sufficient to cause core 49 to magnetically hold armature 48, the knob may be released. When this is done, the parts, under the influence of spring 24, tend to reassume their normal positions. However, movement in that direction is arrested by the engagement of catch 70 on plate 22 with the pin 68, which pin was moved into engaging position when arm 47 was brought to vertical position and is now magnetically retained in that position due to the force of spring 65 which holds lever 55 (to which pin 68 is attached) in engagement with arm 47. With the parts in the positions now assumed, finger 76 still being on the enlarged portion of cam 77, fuel continues to flow to the pilot burner, which condition is indicated by the appearance of the legend "Pilot lit" in the window.

If, for some reason, it should now be desirable to extinguish the pilot burner, this may be done by depressing a push-button 91 provided in an opening 95 (Fig. 7) formed in the outer end portion of stem 19 to which knob 23 is secured. This button is mounted on a rod 92 which extends through a central bore in stem 19 and is provided beyond the left-hand end of the stem with a head 93 which is adapted to engage an upper end portion of lever 55, the head passing through an open area of arm 47. Button 91 is biased outwardly by a spring 94 compressed between the button and a shoulder formed at the inner end of opening 95. When arm 47 is in its magnetically-held position, depression of push-button 91 moves lever 55 with respect to arm 47 against the bias of spring 65 so that pin 68 is moved out of engagement with catch 70, thereby permitting the parts to return to their normal position which is then indicated by the legend "Off." Finger 76 now being out of engagement with the enlarged portion of cam 77, the supplemental valve is closed. Due to the resultant extinction of the pilot-burner flame, the thermoelectric device starts to cool. However, under ordinary conditions, current will still be generated for a period of about 30 seconds in an amount sufficient to magnetically retain the armature in engagement with the core. Should reactuation of the device be attempted during this period, such actuation will be prevented by the engagement of the catch 70 with the pin 68, both sides of this catch being straight as indicated. When, due to sufficient cooling of the thermoelectric device, arm 47 is released, reinitiation of operation of the device may be effected as described above, pin 68 now being out of the path of movement of catch 70 (until after passage of the same).

With the parts in "Pilot lit" position, continued rotation of knob 23 in its "operating" direction will bring the finger 42 of the gear segment 42 into engagement with pin 67. After such engagement, continued rotation of the knob will cause the segment to rotate the idler gear 28 which, by its engagement with rack 33, will effect upward movement of the main-closure stem 34 against the bias of spring 36. Toward the limit of rotation of plate 22, the other catch 69, because of its inclined leading edge, will pass pin 68, lever 55 being momentarily moved out of engagement with arm 47 in this movement. Therefore, when the knob is released, the parts will be retained in the positions shown in Figs. 2 and 4, with the straight side of catch 69 in engagement with pin 68. In this position, as indicated by the legend "Burner on," both the main valve and the supplemental valve are in open position.

It will be observed that, under all conditions of operation, the gear segment 41 is rotatable about its pivot and movable relative to the gear 28. When the arm 54 is not magnetically held and the pin 67, carried by that arm, is therefore out of the path of movement of the finger 42 of segment 41, the segment revolves freely around the gear 28; but when the arm 54 is in its magnetically-held vertical position and segment 41 is brought into engagement with pin 67, subsequent movement of the segment relative to gear 28 is so modified that the gear is then driven by the segment.

Should it be desired to close the main-burner valve: while holding knob 23, push-button 91 is momentarily depressed sufficiently to release catch 69 and the parts are then permitted to return, under the bias of spring 24, to the "Pilot lit" position with catch 70 in engagement with pin 68. Failure of the pilot burner flame, while the device is in either "Burner on" or "Pilot lit" position, effects return of the device to its "Off" position due to the release of catches 69 and 70 when arm 47 is released upon deenergization of the holding core, the bias springs of both the main and supplemental valves then being effective to return the valves to closed position. If, without lighting the pilot burner, the knob is turned to the "Burner on" position, actuation of the main closure member will not be effected since the pin 67 is then out of the path of movement of segment 41, and upon release of the knob the parts will immediately return to their normal positions. It will be noted that since the pilot burner is supplied with fuel in the "Burner on" position, if the pilot burner is then lighted and the parts are retained in "Burner on" position long enough to permit sufficient heating of the thermoelectric device, upon release the parts will be arrested in the "Pilot lit" position, since in the backward movement of plate 22 the armature is momentarily brought into engagement with its core and is then magnetically held. It will be noted that the cam surface of plate 22 recedes at the left-hand side of projection 62, so that when the electro-magnet is deenergized arm 47 can fall away at any position of the cam other than that in which projection 62 is in engagement with roller 60. If it were desired to hold the main closure member in positions intermediate its full-on and closed positions, that could readily be accomplished by providing additional catches positioned between catches 69 and 70 on plate 22.

While I have herein shown and described, by way of illustration, a specific embodiment of my invention as applied to the control of a fuel valve, it is to be understood that the invention is also capable of various other applications and that modifications may be made without departing from the spirit of the invention. I intend therefore that my invention be limited only by the scope of the appended claims. To facilitate understanding of these claims, it is pointed out that the "main member" recited therein is exemplified, in the specific construction illustrated, by the plate 22 which supports elements employed for operation of the valves, such as the "cam means" or projection 62 whereby the "auxiliary member" 54—55 is moved to its active or vertical position, and the cam 77 which forms part of the "first means" for opening the pilot valve.

I claim as my invention:

1. In a fluid control valve having a first and a second port: a first and a second closure means for the respective ones of said ports means, respectively, biasing said closure means to closed position; a main member for operating said closure means and having a first position wherein both of said closure means are unaffected by said main member; a first means, between said main member and said first closure means, arranged so that movement of the main member from its first to a second position effects opening of said first port: an auxiliary member; means biasing said auxiliary member to an inactive position; cam means connected for operation by movement of the main member for placing said auxiliary member in an active position only when the main member is substantially in its second position; means, responsive to a condition whose establishment is dependent upon the first port being open, for then releasably retaining the auxiliary member in said active position while said condition exists; and means conditioned by the auxiliary member to form, only while the auxiliary member is retained in said active position, an operating coupling, between the main member and said second closure means for opening movement of said second closure means on further movement of the main member from its second to a third position; said first means including means for keeping said first closure means open during said further movement and in the third position of the main member.

2. In a fluid control valve having a first and a second port: a first and a second closure means for the respective ones of said ports means, respectively, biasing said closure means to closed position; a main member for operating said closure means and having a first position wherein both of said closure means are unaffected by said main member; means biasing said main member to said first position; a first means, between said main member and said first closure means, arranged so that movement of the main member from its first to a second position effects opening of said first port; an auxiliary member means biasing said auxiliary member to an inactive position; cam means connected for operation by movement of the main member for placing said auxiliary member in an active position only when the main member is substantially in its second position; means, responsive to a condition whose establishment is dependent upon the first port being open, for then releasably retaining the auxiliary member in said active position while said condition exists; means controlled by the auxiliary member, and effective only while the same is retained in said active position, for preventing return of the main member to its first position under the force of its bias so that the first port is then kept open; and means conditioned by the auxiliary member to form, only while the auxiliary member is retained in said active position, an operating coupling, between the main member and said second closure means for opening movement of said second closure means on further movement of the main member from its second to a third position; said first means including means for keeping said first closure means open during said further movement and in the third position of the main member.

3. A fluid control valve as defined in claim 2, and including means controlled by said auxiliary member, and effective only while the same is retained in said active position, for latching said main member in said third position wherein said first and second ports are open.

4. In a fluid control valve having a main and a pilot port, as well as a main and a pilot closure cooperable respectively with said ports means, respectively, biasing said closures to closed position: a main member for operating said closures and having a first position wherein both of said closures are unaffected by said main member; means biasing said main member to said first position; a first means, between said main member and said pilot closure, arranged so that movement of the main member from its first to a second position effects opening of said pilot port; an auxiliary member; means biasing said auxiliary member to an inactive position; cam means connected for operation by movement of the main member for placing said auxiliary member in an active position only when the main member is substantially in its second position; means, responsive to a condition whose establishment is dependent upon the pilot port being open, for then releasably retaining the auxiliary member in said active position only while said condition exists; means forming a lost-motion operating coupling between the main member and said main closure; means controlled by the auxiliary member, and effective only while the same is retained in said active position, for conditioning said lost-motion coupling for opening movement of said main closure on further movement of the main member from its second to a third position; said first means including means for keeping said pilot closure open during said further movement and in the third position of the main member; and means, controlled by the auxiliary member, and effective only while the same is retained in its active position, for selectively latching the main member in its second or third position.

WILLIAM A. RAY.

REFERENCES CITED

The following references are of record in the file of this patent:

UNITED STATES PATENTS

| Number | Name | Date |
| --- | --- | --- |
| 2,258,811 | Ray | Oct. 14, 1941 |
| 2,321,095 | Mantz | June 8, 1943 |
| 2,381,926 | Ray | Aug. 14, 1945 |